(12) United States Patent
Li et al.

(10) Patent No.: US 11,636,263 B2
(45) Date of Patent: Apr. 25, 2023

(54) USING EDITOR SERVICE TO CONTROL ORCHESTRATION OF GRAMMAR CHECKER AND MACHINE LEARNED MECHANISM

(71) Applicant: Microsoft Technology Licensing, LLC, Redmond, WA (US)

(72) Inventors: Zhang Li, Bellevue, WA (US); Michael Wilson Daniels, Redmond, WA (US); Enrico Cadoni, Dublin (IE); Domenic Joseph Cipollone, Montgomery, OH (US); Bhavuk Jain, Redmond, WA (US); Olivier Gauthier, Duvall, WA (US); Kaushik R. Narayanan, Redmond, WA (US); Siqing Chen, Bellevue, WA (US); Alice Yingming Lai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 16/890,227

(22) Filed: Jun. 2, 2020

(65) Prior Publication Data
US 2021/0374340 A1    Dec. 2, 2021

(51) Int. Cl.
  *G06F 40/253*    (2020.01)
  *G06N 5/04*     (2023.01)
  *G06N 20/00*    (2019.01)
(52) U.S. Cl.
  CPC ............ *G06F 40/253* (2020.01); *G06N 5/04* (2013.01); *G06N 20/00* (2019.01)

(58) Field of Classification Search
  CPC .................................. G06N 5/04; G06N 20/00
  See application file for complete search history.

(56) References Cited

U.S. PATENT DOCUMENTS

| | | | | |
|---|---|---|---|---|
| 4,994,966 A | * | 2/1991 | Hutchins | G06F 40/253 704/9 |
| 9,959,296 B1 | * | 5/2018 | Gubin | G06F 16/219 |
| 2002/0128819 A1 | * | 9/2002 | Jessee | G06F 40/253 704/10 |
| 2004/0030540 A1 | * | 2/2004 | Ovil | G06F 40/253 704/1 |
| 2008/0208567 A1 | * | 8/2008 | Brockett | G06F 40/253 704/9 |
| 2009/0326921 A1 | * | 12/2009 | Robertson | G06F 8/34 704/E15.021 |
| 2010/0332217 A1 | * | 12/2010 | Wintner | G06F 40/211 704/9 |

(Continued)

*Primary Examiner* — Jesse S Pullias
(74) *Attorney, Agent, or Firm* — Christopher J. Volkmann; Kelly, Holt & Christenson, PLLC

(57) ABSTRACT

An editor service receives a textual input. The editor service provides the textual input to a rule-based grammar checker to obtain a grammar checker result. The editor service also provides the textual input to a machine learning (ML) fluency model that checks the textual input for errors and provides a ML model result. The editor service aggregates the grammar checker result and the ML model result and generates an editor service output based upon the aggregated results. A representation of the editor service result is provided to the client computing system for surfacing through a user interface.

16 Claims, 12 Drawing Sheets

(56) References Cited

U.S. PATENT DOCUMENTS

| | | | | |
|---|---|---|---|---|
| 2015/0186363 A1* | 7/2015 | Vashishtha | ............ | G06F 40/253 |
| | | | | 707/755 |
| 2017/0220536 A1* | 8/2017 | Chiba | .................... | G06F 40/232 |
| 2017/0286376 A1* | 10/2017 | Mugan | ................. | G06N 3/0454 |

* cited by examiner

USING EDITOR SERVICE TO CONTROL ORCHESTRATION OF GRAMMAR CHECKER AND MACHINE LEARNED MECHANISM

BACKGROUND

Computing systems are currently in wide use. Some computing systems host services that are accessed by client computing systems. The services may include content creation applications, such as word processing applications, spreadsheet applications, slide presentation applications, electronic mail systems, to-do systems, among a wide variety of others.

It is not uncommon for such services to offer assistive mechanisms to assist in the creation of content. For instance, some such services provide access to a rule-based grammar checker. As a user is creating content on a client, the client system intermittently interacts with a hosted service. The hosted service sends the content, along with a request for grammar checking, to an editor service. The editor service can provide textual content to the rule-based grammar checker. The rule-based grammar checker identifies potential errors and also suggestions to address the potential errors. This information is provided back to the client, for surfacing to the user who is entering or creating the content.

The discussion above is merely provided for general background information and is not intended to be used as an aid in determining the scope of the claimed subject matter.

SUMMARY

An editor service receives a textual input. The editor service provides the textual input to a rule-based grammar checker to obtain a grammar checker result. The editor service also provides the textual input to a machine learning (ML) fluency model that checks the textual input for errors and provides a ML model result. The editor service aggregates the grammar checker result and the ML model result and generates an editor service output based upon the aggregated results. A representation of the editor service result is provided to the client computing system for surfacing through a user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some current systems offer rule-based grammar checking services for textual inputs. Because these mechanisms are rule-based mechanisms, they are relatively high precision in identifying and suggesting corrections for some types of grammatical errors. In order to address additional types of errors, additional rules often need to be authored for the rule-based grammar checker. However, there are a wide variety of different types of errors that can also be identified, using a different type of mechanism, such as a machine learning fluency model. The machine learning fluency model uses a machine learned structure that can learn to identify many different types of errors without being expressly programmed to do so.

The present description thus proceeds with respect to using an editor service as an orchestration engine for applying both a rule-based grammar checker and a machine learning model to a textual input to obtain additional suggestions for improving the grammar and fluency of the textual input, in addition to those surfaced by the rule-based grammar checker. Based upon the results output by the rule-based grammar checker and the machine learning fluency model, the editor service selects an output that is to be surfaced for the users, and generates a representation of that output that can be sent to the client computing system for surfacing to the user. The present description thus describes a system that surfaces significantly more suggestions to the user, than a system which simply uses a rule-based grammar checker. In addition, user interaction with the suggestions can be detected and used to provide additional machine learning to the machine learned structure in the fluency model. In this way, the model improves its own performance based on the user interactions with the suggestions that it generates. Also, while the present description proceeds with respect to the orchestration engine controlling interaction with a single machine learning fluency model, it may orchestrate interaction with multiple machine learning models. These may include models that run alongside the fluency model discussed herein and that operate on different kinds of linguistic phenomena or potential critique areas. A single machine learning model is described for the sake of example only.

Figure 1:
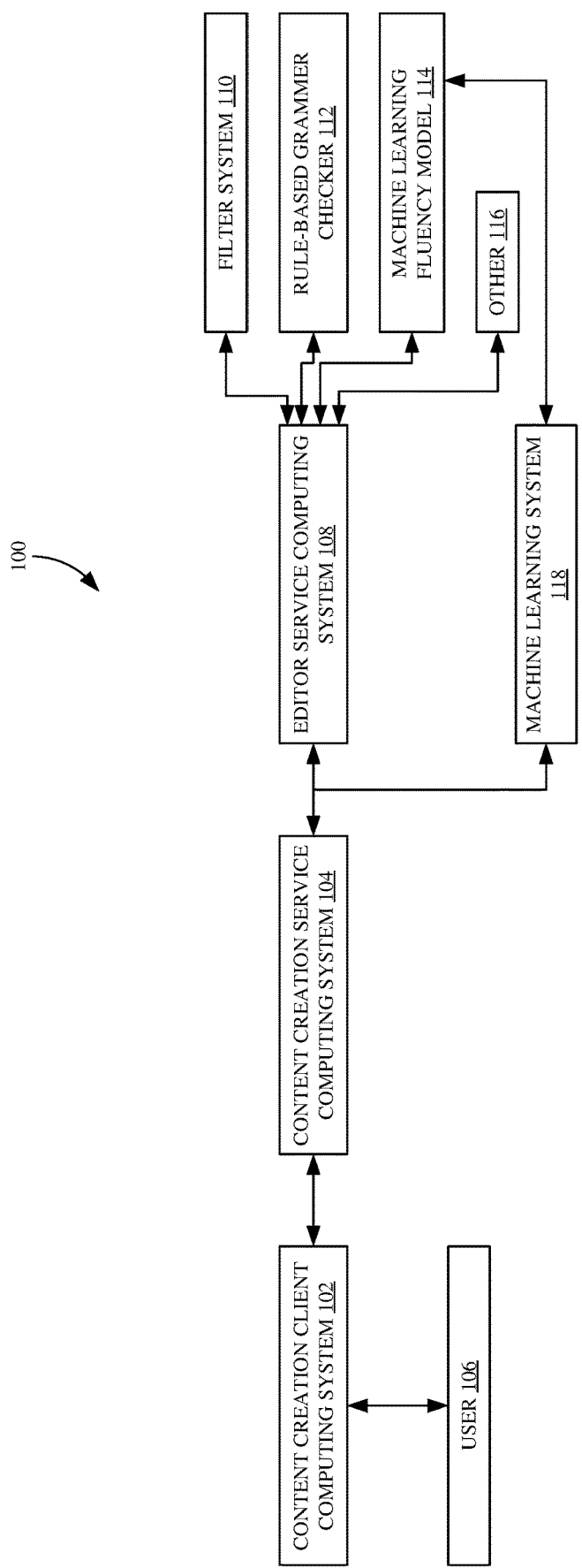
FIG. 1 is a block diagram showing one example of a computing system architecture.

FIG. 1 is a block diagram of one example of a computing system architecture 100. Architecture 100 shows a content creation client computing system 102 interacting with a. content creation service computing system 104 that hosts a content creation service. A user 106 interacts with client system 102 to generate content. Client system 102 can include a client component of the content creation service, so that the user 106 can use the client system 102 to interact with the service computing system 104 to create content.

The content creation service computing system 104 can provide textual inputs corresponding to portions of the content that is being created, to editor service computing system 108. Editor service computing system 108 is shown with access to filter system 110, rule-based grammar checker 112, machine learning fluency model 114, and it can have access to other items 116. Content creation service computing system 104 can also provide information (indicative of user interactions) to machine learning system 118. Machine learning system 118 can perform machine learning on the machine learning fluency model 114, based upon the user interactions, to improve the performance of machine learning fluency model 114. This is described in more detail below.

Briefly, in operation, as the user 106 creates content, portions of that content are sent from content creation service computing system 104 to editor service computing system 108. Editor service computing system 108 filters the information using filter system 110, and then orchestrates how the filtered information is provided to rule-based grammar checker 112 and machine learning fluency model 114. In one example, editor service computing system 108 provides the textual input (or the filtered textual input) to grammar checker 112 and fluency model 114, simultaneously. In another example, it provides the textual input (or filtered textual input) to grammar checker 112 and fluency model 114, sequentially.

In either case, editor service computing system 108 can receive results from rule-based grammar checker 112 and from the machine learning fluency model 114. Those results will illustratively identify potential errors in the textual input, and provide suggestions for addressing those potential errors. Editor service computing system 108 then controls how the outputs from grammar checker 112 and fluency model 114 are provided back to content creation service computing system 104 which can control how they are surfaced for user 106.

For instance, it may be that the results from grammar checker 112 and fluency model 114 both detect an error on the same textual elements of the textual input. In that case, editor service computing system 108 controls how those "overlapping" errors and suggestions are provided back to the content creation service computing system 104. For instance, it may be that the editor service computing system 108 selects one set of results, and discards the other set. It may be that system 108 aggregates both sets of results and provides an output representing both sets of results. It may be that the editor service computing system 108 selects one set of results over the other set of results under certain circumstances, but under different circumstances, it selects the other set of results. All of these and other operations are contemplated herein.

Content creation service computing system 104 then surfaces the errors and suggestions, through client system 102, for user 106. User 106 can accept and apply one of the suggestions, reject the suggestions, etc. In one example, this user interaction is detected by computing system 104 and that interaction is provided to machine learning system 118. Machine learning system 118 can aggregate user interaction data until a threshold amount is aggregated, and can then perform additional machine learning on the machine learning fluency model 114 in order to improve its performance. For instance, if editor service computing system 108 provides, as an output, a suggestion from machine learning fluency model 114, so that the suggestion is surfaced for interaction by user 106, then if user 106 accepts the suggestion, this can be detected and indicated to machine learning system 118. However, if user 106 rejects the suggestion, then this interaction can also be detected and provided to machine learning system 118. When a user interacts with a desired amount of suggestions that are provided by machine learning fluency model 114, then the machine learning algorithm can be executed, based upon the user interaction data. Machine learning system 118 can re-learn the machine learned structure for making decisions in model 114 to improve the performance of machine learning fluency model 114.

Figures 1A, 1B:
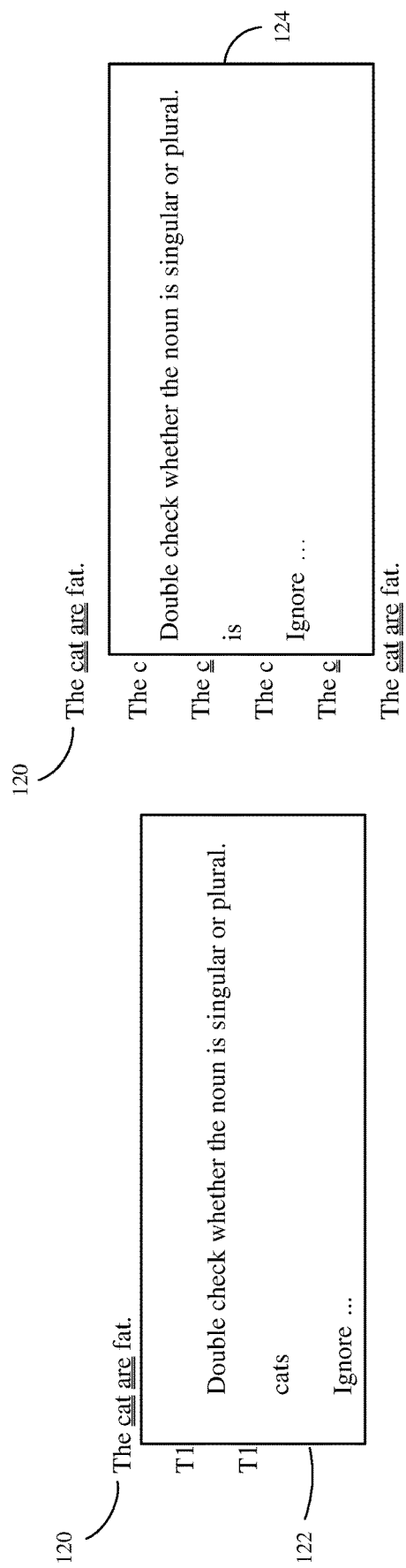
FIGS. 1A and 1B show examples of editor service results that are surfaced for a user in a user interface.

FIGS. 1A and 1B show examples of two different errors and suggestions that can be identified. FIG. 1A shows one example of a textual input 120. FIG. 1B shows the same textual input 120. It can be seen that there is a grammatical error in the textual input 120, which can be corrected by either correcting the number of the noun "cat" or the verb "are". For instance, in FIG. 1A, an error is flagged on the word "cat" and suggestions for fixing it are indicated in the dropdown box 122. Dropdown box 122 states "double-check whether the noun is singular or plural". It also suggests a plural form of the noun "cats". In FIG. 1B, the error is flagged on the verb "are" and the suggestion is indicated in the dropdown box 124, which reads "double-check that you are sticking to singular or plural". It also provides a suggestion for the verb "is".

In one example, and again referring to the architecture 100 shown in FIG. 1, the user 106 types the textual input 120 which is provided through client system 102 to content creation service computing system 104. System 104 then provides the textual input to editor service computing system 108 which can apply filters (as is described in greater detail below) and submit the textual input to the rule-based grammar checker 112 and machine learning fluency model 114.

It may be, for example, that grammar checker 112 flags the error on the noun as shown in FIG. 1A while machine learning fluency model 114 flags the error on the verb shown in FIG. 1B. In such an example, editor service computing system 108 receives the outputs indicative of those flagged errors and the corresponding suggestions, from grammar checker 112 and fluency model 114, and controls which of those are provided to client creation service computing system 104 for surfacing to user 106. The user can then accept one of the suggestions (such as by clicking on "cats" or "is") or ignore the suggestion by clicking the "ignore" button. That user interaction can be detected by system 104 and sent to machine learning system 118 for improving the machine learning fluency model 114.

Figure 2:
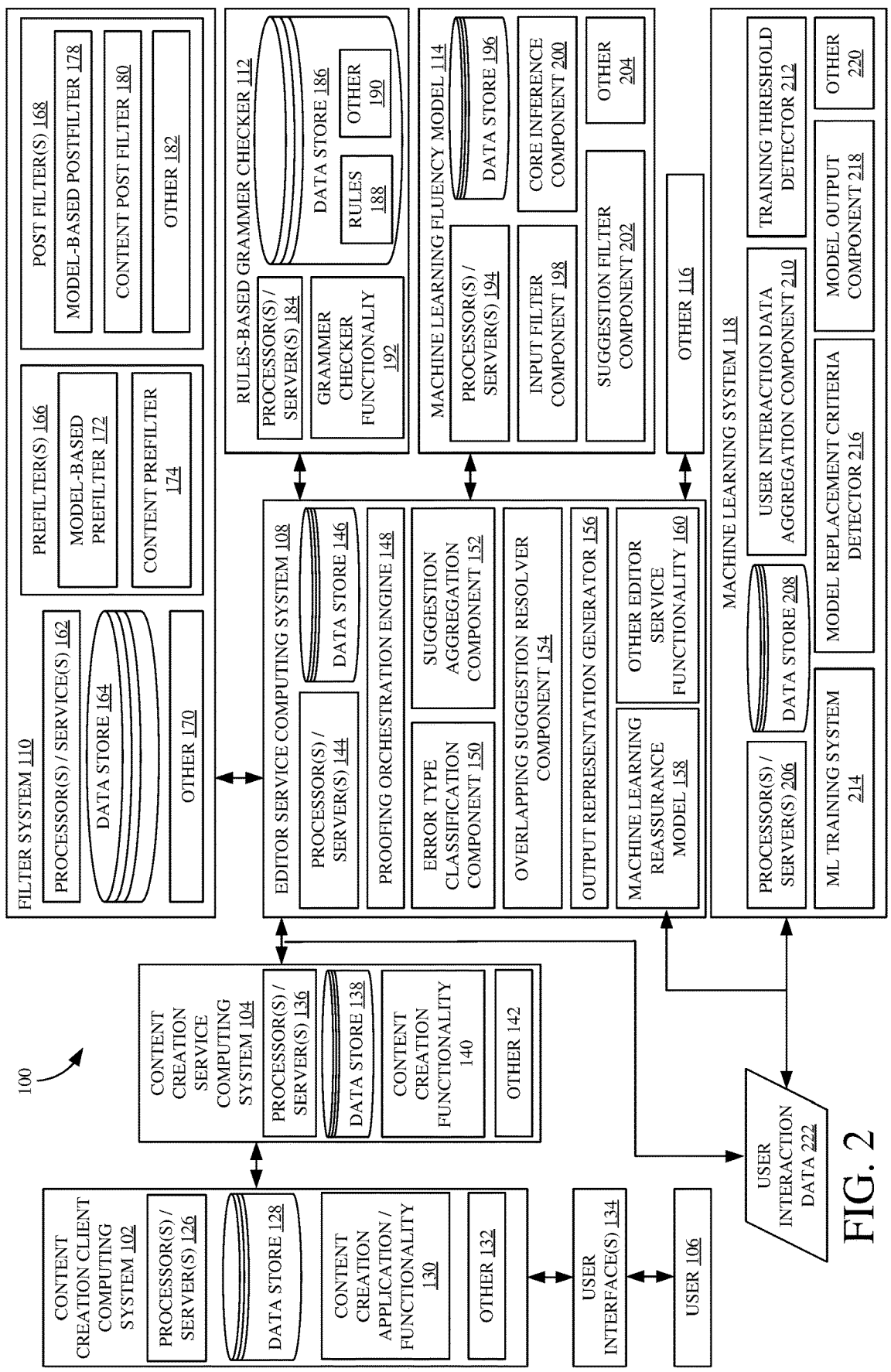
FIG. 2 is a block diagram showing the computing system architecture illustrated in FIG. 1, in more detail.

FIG. 2 is a block diagram showing one example of the architecture 100 illustrated in FIG. 1, showing some items in more detail. Some of the items shown in FIG. 2 are similar to those shown in FIG. 1. Similar items are similarly numbered.

FIG. 2 shows that content creation client computing system 102 (also referred to as the client or client system) illustratively includes one or more processors or servers 126, data store 128, content creation application/functionality 130, and it can include a wide variety of other items 132. Client system 102 generates a user interface 134 for interaction by user 106. User 106 illustratively interacts with user interface 134 in order to use application/functionality 130 to create content. Content creation service computing system 104 illustratively includes one or more processors or servers 136, data store 138, content creation functionality 140, and it can include a wide variety of other items 142. Content creation functionality 140 can be a content creation service hosted by computing system 104. For instance, it can be a hosted word processing service, a hosted electronic mail service, a hosted slide presentation service, a hosted spreadsheet service, among a wide variety of other things. Functionality 130 on client system 102 can be a client component of the service hosted by computing system 104. Thus, application/functionality 130 can communicate with functionality 140, based upon user interactions with user interfaces 134, in order to create documents, spreadsheets, slide presentations, electronic mail messages, etc.

FIG. 2 also shows that editor service computing system 108 can include one or more processors or servers 144, data store 146, proofing orchestration engine 148, error type classification component 150, suggestion aggregation component 152, overlapping suggestion resolver component 154, output representation generator 156, machine learning reassurance model 158, and it can include a wide variety of other editor service functionality 160. Filter system 110 can include one or more processors or servers 162, data store 164, prefilters 166, post filters 168, and it can include other items 170. The prefilters 166 can include model-based prefilters 172, one or more content prefilters 174, and other prefilters 176. Post filters 168 can include one or more model-based post filters 178, one or more content post filters 180, and other post filters 182. Rule-based grammar checker 112 illustratively includes one or more processors or servers 184, data store 186 (which can have rules 188 and other items 190 stored therein), and other grammar checker functionality 192. Machine learning fluency model 114 illustratively includes one or more processors or servers 194, data store 196, input filter component 198, core inference component 200, suggestion filter component 202, and it can include other items 204. Machine learning system 118 can include one or more processors or servers 206, data store 208, user interaction data aggregation component 210, training threshold detector 212, machine learning training system 214, model replacement criteria detector 216, model output component 218, and it can include other items 220.

Before describing the overall operation of architecture 100 in more detail, a brief description of some of the items in architecture 100, and their operation, will first be provided. As discussed above, user 106 can interact with user interfaces 134, client system 102, and content creation functionality 140 on service computing system 104 in order to create content. For instance, user 106 may type textual inputs in order to create a document. Content creation functionality 140 can then intermittently pass that textual input to editor service computing system 108 along with a request that it be proofed, and where other editing services can be performed based on the textual input. Proofing orchestration engine 148 handles the interactions with filter system 110, rule-based grammar checker 112, and machine learning fluency model 114 and among other things in architecture 100. For instance, proofing and orchestration engine 148 can first have filter system 110 apply the prefilters 166. A model-based prefilter 172 can be run on the textual input to identify portions of the textual input that are to be provided to rule-based grammar checker 112 and/or machine learning fluency model 114. It may be, for instance, that the textual input is relatively long. Machine learning fluency model 114 may be a relatively expensive model to run in terms of computing overhead and time consumption. Thus, model-based prefilter 172 may be a relatively lightweight (or simplified) version of model 114 and the output of model-based prefilter 172 may be indicators identifying which portions of the textual input should be submitted to machine learning fluency model 114 (and/or rule-based grammar checker 112) for further processing. The model-based prefilter 172 can filter based on other filter criteria as well.

Content prefilter 174 may filter the textual input based upon the specific content of the textual input. For instance, there may be certain content terms that are not to be submitted to further grammar checking or fluency model proofing.

Orchestration engine 148 also coordinates providing the textual input (whether prefiltered or not) to rule-based grammar checker 112 and machine learning fluency model 114. Rule-based grammar checker 112 uses functionality 192 to access rules 188. It applies those rules to the textual input that is being processed. When a rule triggers, this causes functionality 192 to flag a potential error. The rule can be linked to, or point to, a suggestion that addresses the error. It provides, this (an indication of the potential errors and suggestions) as an output back to editor service computing system 108.

Either simultaneously with providing the textual input to rule-based grammar checker 112, or at a different time, proofing orchestration engine 148 provides the textual input (whether prefiltered or not) to machine learning fluency model 114. Input filter component 198 applies filter criteria to filter out any portion of the textual input that is not to be subjected to further fluency model processing. For instance, it may be that the textual input is still relatively long, or that it is an invalid input in some way (e.g., includes invalid characters, words, etc.). Those items can be filtered from the textual input before it is provided to the core inference component 200. Core inference component 200 illustratively includes a machine learned structure such as an artificial neural network or deep neural network, a Bayesian network, a decision tree, a support vector machine, etc. The machine learned structure is trained using machine learning to make decisions, given an input, with respect of possible fluency issues in the model input (e.g., the textual input) and to identify suggestions for addressing those issues. Thus, the core inference component 200 identifies potential fluency errors and corresponding suggestions to address those errors, in the textual input. Fluency errors can include such things as grammatical (syntax) errors, semantic and lexical errors, stylistic errors, spelling errors, morphology errors, punctuation and typographical errors, etc.

The information identifying errors and corresponding suggestions is provided to suggestion filter component 202 which filters the suggestions so that unwanted suggestions are not output by the model. For instance, it may be that the model suggests the exact same thing as the textual input. In that case, the suggestions are filtered by suggestion filter component 202. It may be that the model suggests an invalid character or some other type of invalid output. Those suggestions are also filtered by suggestion filter component 202. The output (unfiltered potential errors and suggestions) are then provided by machine learning fluency model 114 to proofing orchestration engine 148.

Engine 148 then provides the output of fluency model 114 and rule-based grammar checker 112 to error type classification component 150 which classifies the types of errors that are identified by grammar checker 112 and fluency model 114. There may be a variety of different types of errors that are identified, as mentioned above.

Suggestion aggregation component 152 aggregates all of the suggestions provided by rule-based grammar checker 112 and machine learning fluency model 114. There may be some overlapping errors. For instance, it may be that the output of rule-based grammar checker 112 identifies an error at one portion of the textual input and that machine learning fluency model 114 also identifies an error at that same location in the textual input. Overlapping suggestion resolver component 154 identifies portions of the textual input that are affected by the different suggestions or that otherwise correspond to the identified errors, to see if those textual portions overlap. If they do, overlapping suggestion resolver component 154 resolves the overlapping suggestions by choosing one of them, or both of them, for surfacing to the user. The resolution criteria may be to choose the output of rule-based grammar checker 112 over that of machine learning fluency model 114, or vice versa. The resolution criteria may include outputting both of the errors and corresponding suggestions for interaction by user 106, but in a certain order. Other criteria can be used as well.

Output representation generator 156 then generates a representation of the output that will be surfaced for user 106, identifying the potential error and one or more suggestions to resolve it.

Machine learning reassurance model 158 is illustratively run on the output representation and on the original textual input to gain additional assurance that the suggestion is actually suggesting an improvement to the original textual input. For instance, the suggestion may be widely different from the original textual input, in which case it may be less likely to be a correct suggestion. However, the suggestion may be very close to the original textual input, but with some changes. This may indicate that it is more likely to be a correct suggestion. The distance between the original textual input and the suggestion is only one measure as to whether the suggestion is likely accurate, and a wide variety of other measures can be used by machine learning reassurance model 158 as well. Model 158 illustratively outputs a value indicative of the likelihood that the suggestion will be helpful to, or adopted by, user 106.

Assuming that machine learning reassurance model 158 outputs a metric indicating that the suggestion is likely correct, and should be provided to the user 106, the proofing orchestration engine 148 outputs that representation to content creation service computing system 104, where it can be forwarded to the client system 102 for surfacing to user 106 through user interface 134.

User 106 can then interact with the representation surfaced for the potential errors. For example, the user can take the suggestion, ignore the suggestion, etc. The content creation functionality 140 in service computing system 104 detects the user interaction and provides user interaction data 222, indicative of that user interaction, to machine learning system 118. User interaction data aggregation component 210 aggregates user interaction data corresponding to suggestions that are surfaced. When the amount of user interaction data reaches a desired amount, then training threshold detector 212 determines that the data can be used by machine learning training system 214 in order to retrain the core inference component 200 of machine learning fluency model 114. Model replacement criteria detector 216 determines whether the retrained model is sufficiently improved over the prior model that the retrained model should replace the prior model. For instance, if the model accuracy has increased by a threshold amount, this may meet the replacement criteria and be detected by model replacement criteria detector 216. A wide variety of other replacement criteria can be used as well. When the replacement criteria are met, model output component 218 outputs the retrained model so that it can replace the core inference component 200 (and/or other portions of machine learning fluency model 114) to be used thereafter in processing textual inputs until another replacement model is generated.

Figure 3A:
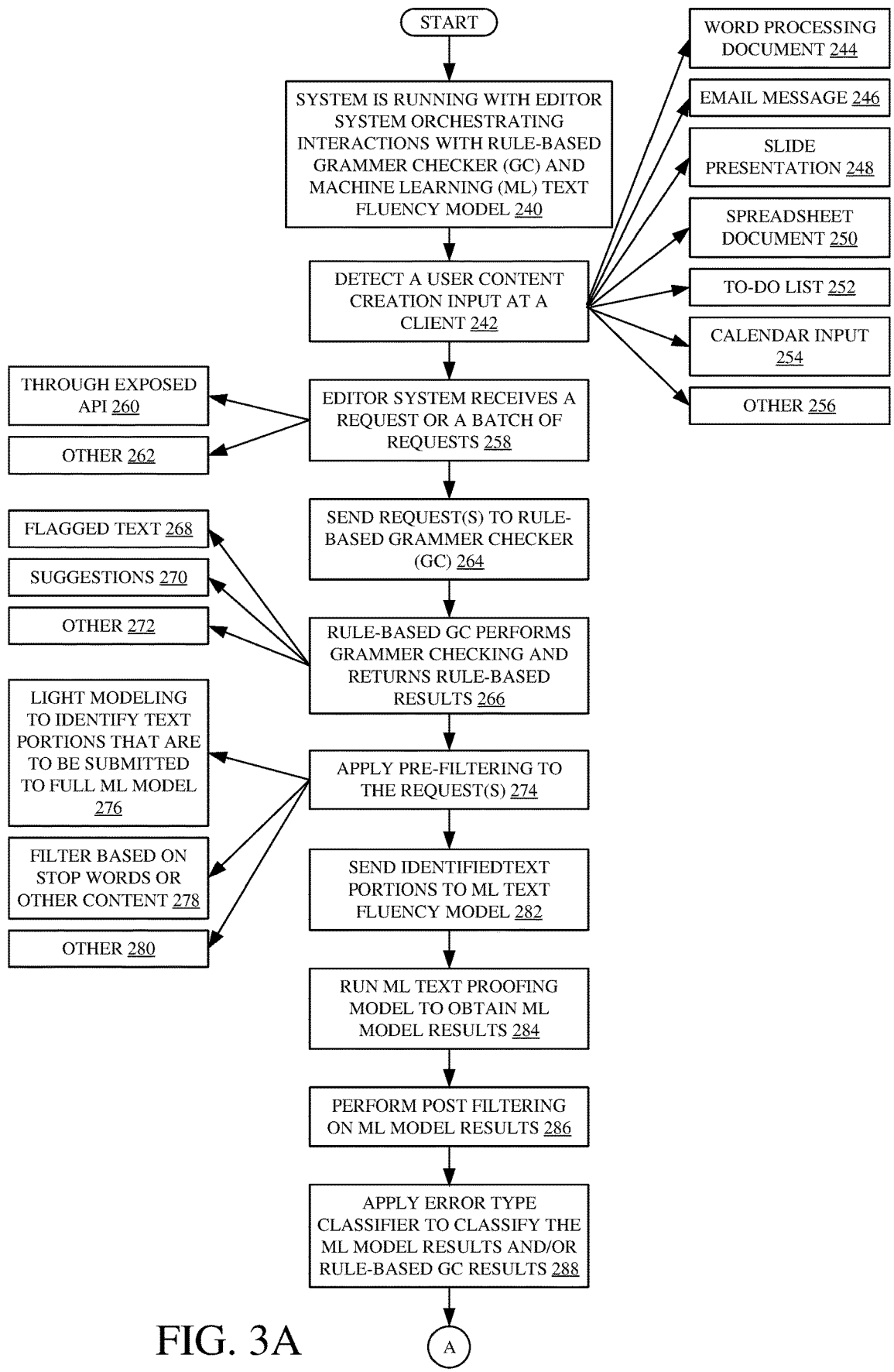
FIGS. 3A, 3B and 3C (collectively referred to herein as FIG. 3) show a flow diagram illustrating one example of the operation of the architecture illustrated in FIG. 2, in more detail.
Figure 3B:
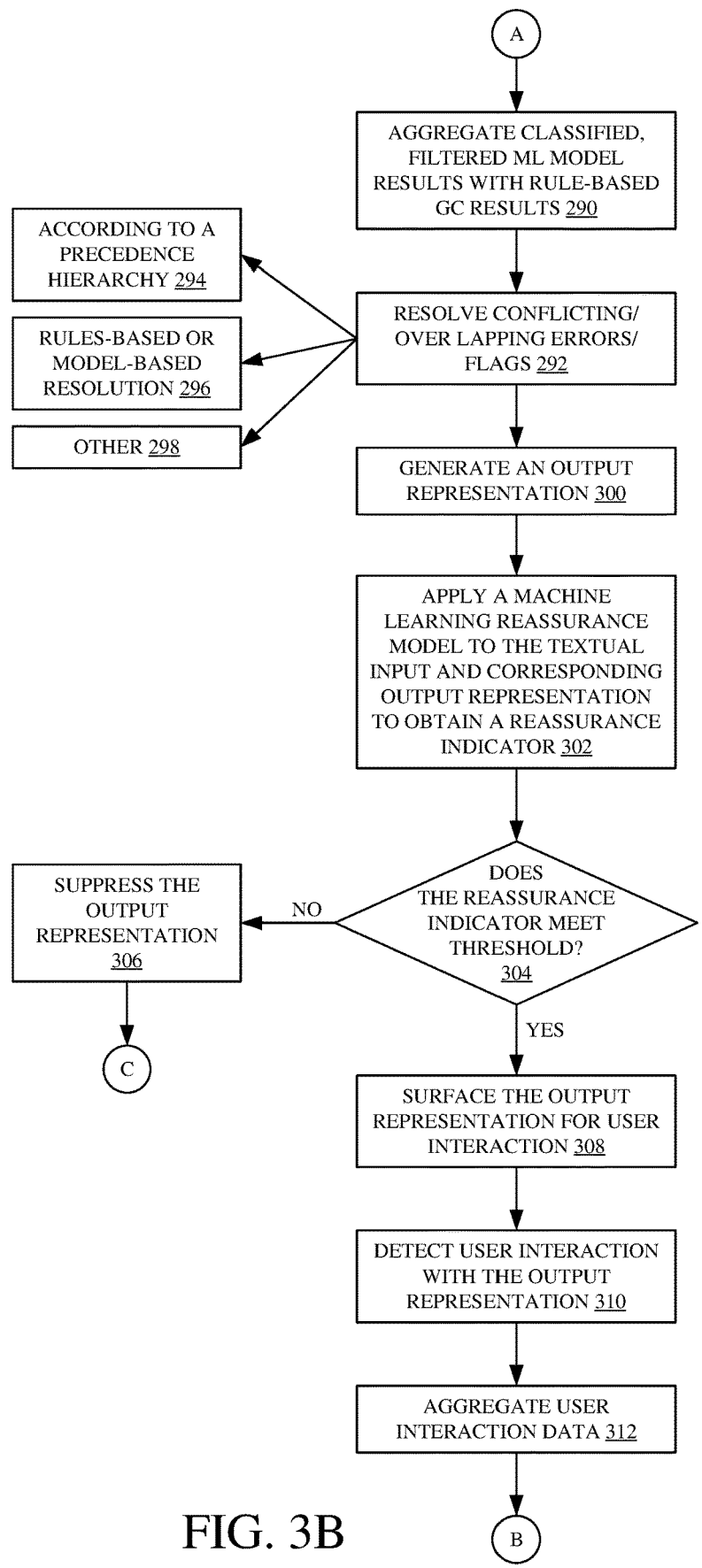
Figure 3C:
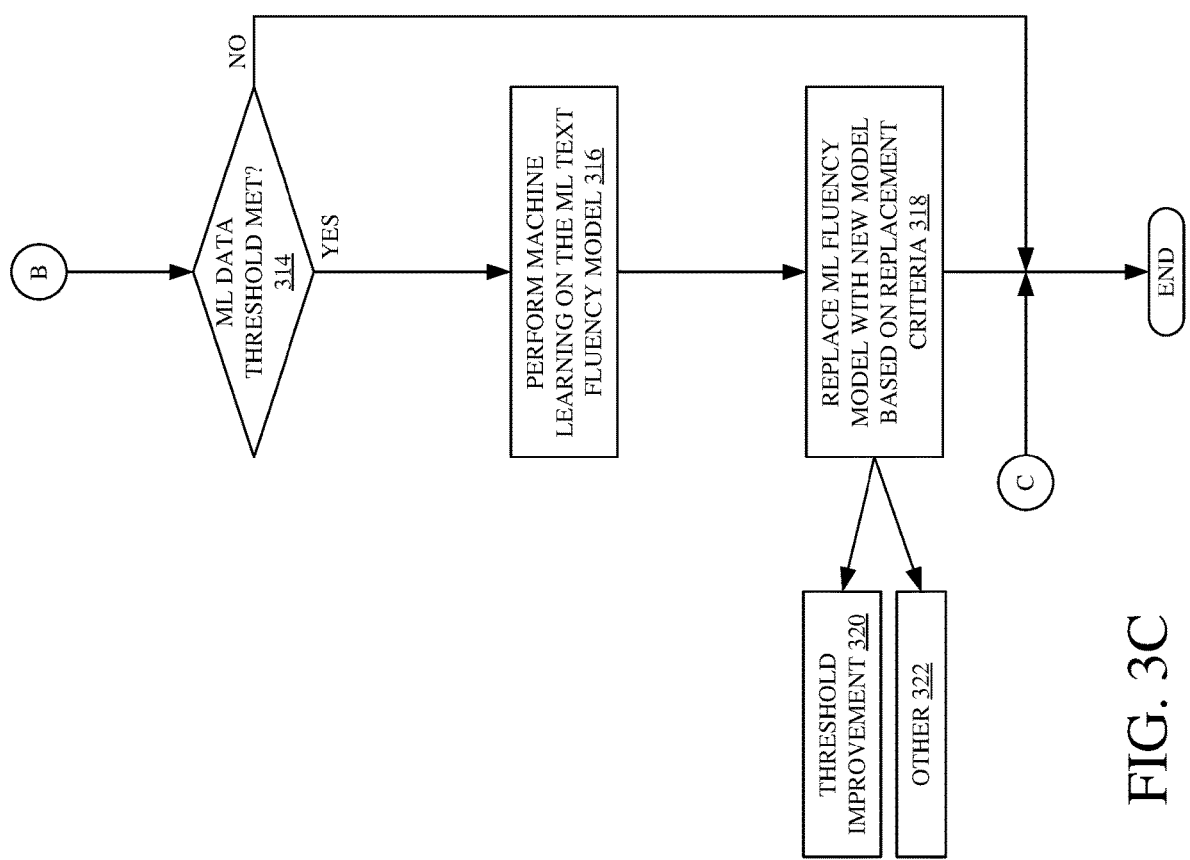

FIGS. 3A, 3B and 3C (collectively referred to herein as FIG. 3) show a flow diagram illustrating one example of the operation of architecture 100 in processing a textual input. It is first assumed that architecture 100 is running with editor service proofing orchestration engine 148 orchestrating interactions with rule-based grammar checker 112 and machine learning proofing model (or fluency model) 114. This is indicated by block 240 in the flow diagram of FIG. 3.

User 106 then interacts with user interfaces 134 in order to provide a content creation input (such as a textual input). This is detected by client system 102 and provided to content creation service computing system 104. Content creation functionality 140 intermittently provides the textual input to editor service computing system 108 where the editor services can be performed on the textual input. Detecting a user content creation input at a client 102 is indicated by block 242 in the flow diagram of FIG. 3. Again, the content creation input can be input to a word processing document 244, an electronic mail message 246, a slide presentation 248, a spreadsheet document 250, a to-do list 252, a calendar input 254, or it can be any of a wide variety of other content creation inputs 256.

At some point, the textual input will be sent to, and received by, editor service computing system 108. It will be noted that the textual inputs can be batched as well, and sent to editor service computing system 108 in batches. For purposes of the present discussion, it will be assumed that a single textual input is sent. It will be recognized, though, that when a batch of textual inputs is sent, the processing performed on each item in the batch can be similar to the processing described herein for a single textual input.

Receiving, at the editor service computing system 108, a textual input along with a request to perform editor services is indicated by block 258 in FIG. 3. The textual input can be received through an exposed API, that is exposed by editor service computing system 108, as indicated by block 260, or in other ways, as indicated by block 262.

Proofing orchestration engine 148 then sends the request to the rule-based grammar checker 112. This is indicated by block 264 in the flow diagram of FIG. 3. The rule-based grammar checker applies the rules 188 to perform grammar checking and return a rule-based grammar checker result. This is indicated by block 266. The result can include flagged text 268 that identifies a possible error, as well as one or more suggestions 270 for addressing the possible error in the flagged text 268. The result can include other items 272 as well.

Proofing orchestration engine 148, prior to sending the textual input in the request to machine learning fluency model 114, illustratively sends the textual input to filter system 110 to have the prefilters 166 applied to the textual input in the request. This is indicated by block 274 in FIG. 3. In one example, as discussed above, the prefilters 166 can include model-based prefilter 172 which performs relatively light (in terms of computational and time resources) modeling to identify text portions in the textual input that are to be submitted to the full machine learning fluency model 114. This is indicated by block 276. Content prefilter 174 can also be applied to filter the textual input based upon stop words, or other content. This is indicated by block 278. Other prefilters 176 can be applied in other ways as well, and this is indicated by block 280.

The filtered text portions in the textual input are then provided to machine learning fluency model 114. This is indicated by block 282 in the flow diagram of FIG. 3. The model 114 is then run on the textual input to obtain results. This is indicated by block 284. One example of how the model 114 operates on the textual input is described in greater detail below with respect to FIG. 4.

Proofing orchestration engine 148 can access filter system 110 to have post filters 168 applied to the results form one or both of rule-based grammar checker 112 and machine learning fluency model 114. Again, the post filters can be model-based post filters 178, content-based post filters 180, or other filters 182. Performing post filtering on the results is indicated by block 286 in the flow diagram of FIG. 3.

Orchestration engine 148 then uses error type classification component 150 to apply an error type classifier to classify the results. This is done to identify the type of error flagged by the model and/or grammar checker, if the error type has not already been identified. This is indicated by block 288 in the flow diagram of FIG. 3.

Suggestion aggregation component 152 then aggregates the classified and filtered machine learning model results with the rule-based grammar checker results. This is indicated by block 290 in the flow diagram of FIG. 3. As discussed above, it may be that both grammar checker 112 and fluency model 114 identified errors in the same position in the textual input. In that case, the errors are overlapping errors in that the same word or position in the textual input has two different errors flagged by the two different proofing systems. Thus, overlapping suggestion resolver component 154 resolves any conflicting or overlapping flag, errors or suggestions identified in the textual input. This is indicated by block 292. In one example, overlapping suggestion resolver component 154 resolves the overlapping suggestions according to a precedence hierarchy. The precedence hierarchy may rank some errors higher than others so that the suggestions to fix those errors are ranked ahead of the other errors. In another example, the precedence hierarchy may rank grammar checker 112 or fluency model 114 ahead of the other. Thus, the overlapping suggestions are resolved based on that hierarchy. Resolving the overlapping suggestions based on a precedence hierarchy is indicated by block 294. In another example, it may be that that either the rule-based grammar checker results or the model-based results are always to be placed ahead of the other. In another example, certain classes of errors identified by the fluency model 114 may be placed ahead of certain classes of errors identified by the grammar checker 112, or vice versa. This is indicated by block 296 in the flow diagram of FIG. 3. The overlapping or conflicting errors can be resolved in other ways as well, and this is indicated by block 298.

Output representation generator 156 then generates an output representation, corresponding to the possible error and suggestion, that is to be surfaced for user 106. Generating the output representation is indicated by block 300.

Also, in one example, before sending the representation back to the content creation service 104, proofing orchestration engine 148 first applies a machine learning reassurance model 158 to gain additional assurance that the suggestion to be surfaced is going to be a helpful suggestion. Thus, the machine learning reassurance model 158 is applied to both the original textual input and to the suggestion that was generated. Reassurance model 158 outputs a reassurance indicator indicative of a level of confidence that model 158 has that the suggestion will be helpful. This is indicated by block 302. Again, for instance, if the suggestion is the exact same as the textual input, then the suggestion will not be helpful. If the suggestion has an invalid character, or meets other criteria, then it may or may not be helpful as well. The user interaction data 222 can also be provided to model 188 so it can continue to train itself to improve performance Thus, model 158 can have a machine learning system similar to system 158, or it can use system 158.

Proofing orchestration engine 148 then determines whether the reassurance indicator meets a threshold level. This is indicated by block 304. If not, then the representation that was to be output by editor service computing system 108 is suppressed, and no output is returned. This is indicated by block 306.

However, if, at block 304, it is determined that the threshold reassurance indicator meets the threshold level, then orchestration engine 148 provides the output (the possible error and suggestion) to the content creation functionality 140 in service computing system 104, where it can be provided back to client system 102 for surfacing to user 106 through user interfaces 134. Surfacing the output representation for user interaction is indicated by block 308 in the flow diagram of FIG. 3. Client system 102 and/or service system 104 then detect user interaction with the suggestion. This is indicated by block 310. The user interaction is represented by user interaction data 222 which is provided back to machine learning system 118. User interaction data aggregation component 210 aggregates user interaction data, until a machine learning data threshold has been met. This is indicated by blocks 312 and 314 in the flow diagram of FIG. 3. If the amount of user interaction data aggregated meets the machine learning data threshold, then this is detected by training threshold detector 212. Machine learning training system 214 then retrains the machine learning fluency model 114 based upon the aggregated user interaction data. This is indicated by block 316 in the flow diagram of FIG. 3.

If model replacement criteria detector 216 detects that the retrained model meets the replacement criteria (e.g., it meets a threshold level of improvement over the existing model, etc.) then model output component 218 outputs the model so that it can replace the existing machine learning fluency model 114. This is indicated by block 318. Detecting a threshold level of model improvement as the replacement criteria is indicated by block 320. Of course, a wide variety of other replacement criteria can be used as well, and this is indicated by block 322.

Figure 4:
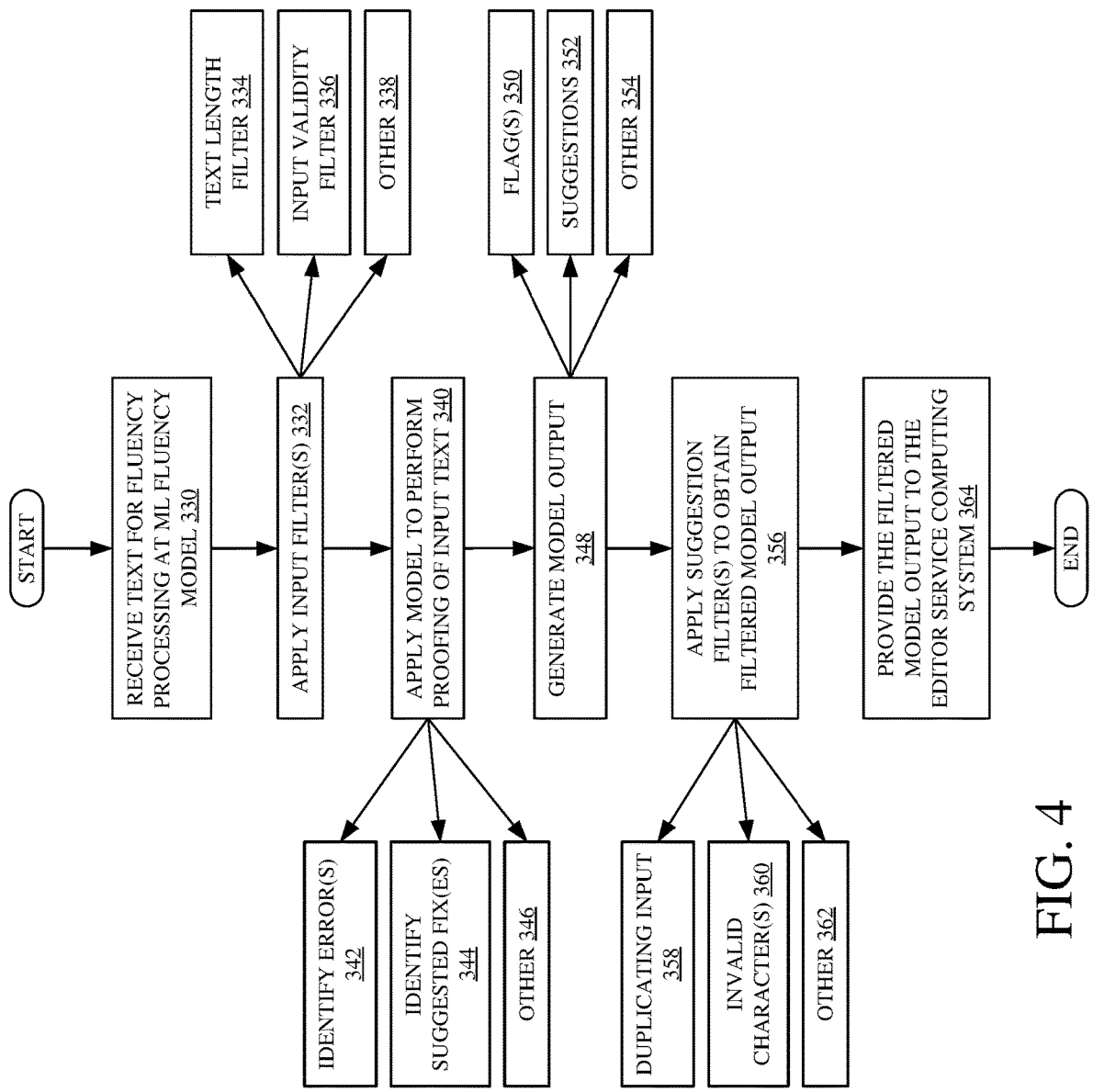
FIG. 4 is a flow diagram illustrating one example of the operation of a machine learning fluency model, in more detail.

FIG. 4 is a flow diagram illustrating one example of the operation of machine learning fluency model 114 in processing a textual input to identify errors and suggestions, in more detail. Machine learning fluency model 114 first receives a textual input for fluency processing. This is indicated by block 330 in the flow diagram of FIG. 4. Input filter component 198 applies one or more input filters to the textual input. This is indicated by block 332. For example, client component 198 may apply a length filter in that there may be a maximum desirable length of textual inputs to which machine learning fluency model 114 is to be applied. Longer inputs may consume an undesirably large amount of computational and time resources. Applying a text length filter is indicated by block 334 in the flow diagram of FIG. 4.

Input filter component 198 may apply other filters as well. For instance, there may be certain invalid inputs that were not identified by any of the prefilters. Those invalid inputs may be identified using an input validity filter, as indicated by block 336. Input filters can include a wide variety of other filters as well, and this is indicated by block 338.

The machine learned structure represented by the core inference component 200 is then applied to the textual input to perform proofing of the textual input. This is indicated by block 340. In one example, the core inference component 200 identifies possible errors, as indicated by block 342, and identifies suggested fixes to address those errors, as indicated by block 344. The model can perform other operations as well, in proofing the textual input, and this is indicated by block 346.

The output of core inference component 200 is generated to include an error indicator, such as a flag, along with the suggestions that were identified at block 344. Generating the model output is indicated by block 348. Including flags is indicated by block 350 and including suggestions is indicated by block 352. The model output can include other items as well, and this is indicated by block 354.

Suggestion filter component 202 then applies one or more suggestion filters to obtain a filtered model output from machine learning fluency model 114. Applying the suggestion filters is indicated by block 356. The suggestion filters can use a wide variety of different filter criteria. For instance, if the suggestion is duplicating the textual input, then the suggestion filter may identify this. This is indicated by block 358. If the suggestion contains an invalid character or character string, this may also be identified by the suggestion filters. This is indicated by block 360. The suggestion filters can identify and filter out other items as well, and this is indicated by block 362. Machine learning fluency model 114 then outputs the filtered model output to the editor service computing system 108. This is indicated by block 364.

It can thus be seen that the present description describes an editor service that is used to orchestrate the application of a rule-based grammar checker and a machine learning fluency model to a textual input. The results of the grammar checker and fluency model can be aggregated and a representation can be generated based upon those model outputs, that can be surfaced for user interaction. Therefore, the user interface need not change and the user need not know which particular item generated the suggestion. User interactions with the suggestions can be detected and incorporated into additional machine learning for the fluency model.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
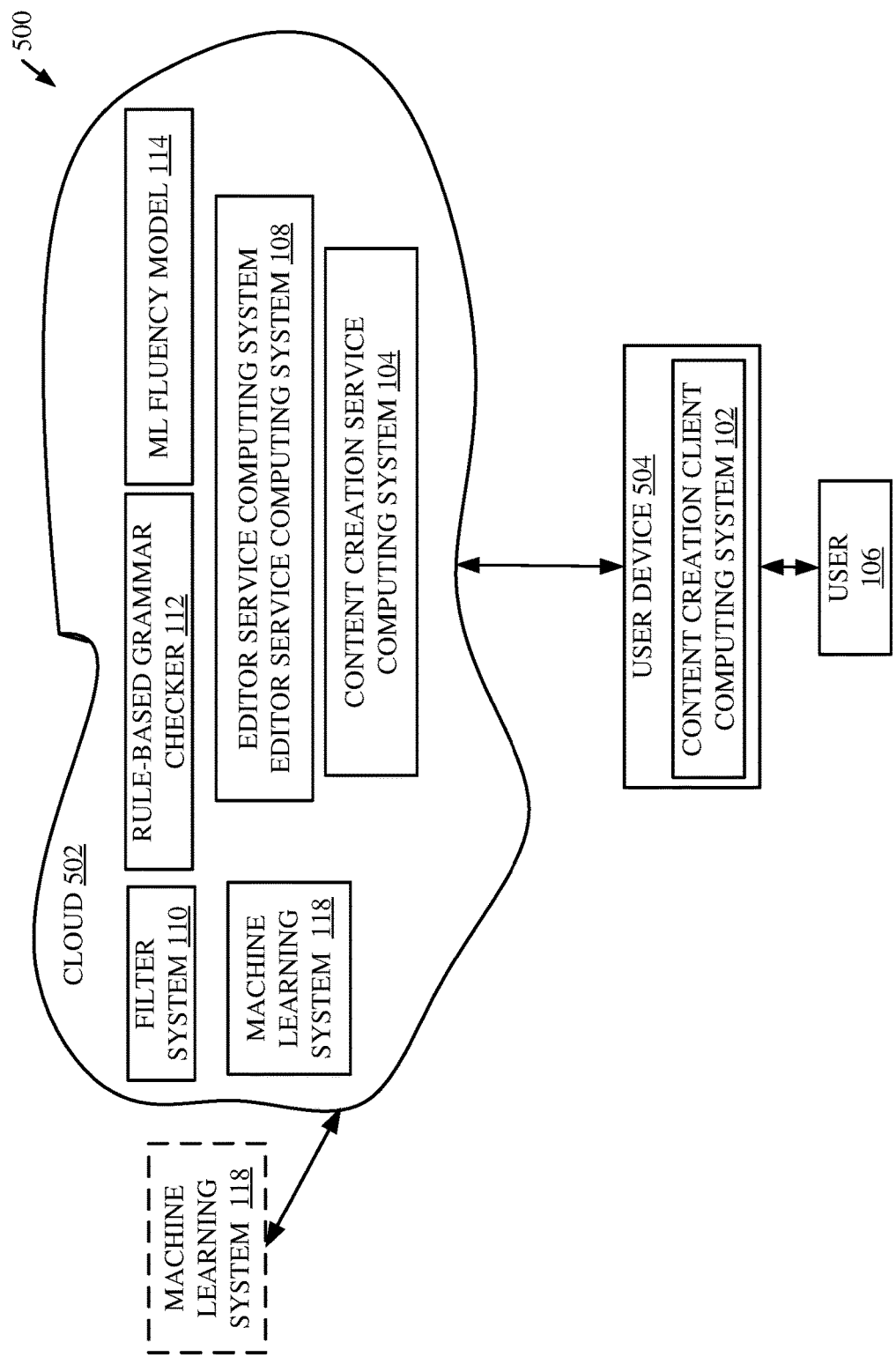
FIG. 5 is a block diagram showing one example of the architecture illustrated in FIGS. 1 and 2, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 104, 108, 110, 118, and grammar checker 112 and model 114 can be located in cloud 502 (which can be public, private, or a combination where portions are public while others are private). Therefore, user 106 uses a user device 504 to access those systems through cloud 502.

FIG. 5 also depicts another example of a cloud architecture. FIG. 5 shows that it is also contemplated that some elements of architecture 100 can be disposed in cloud 502 while others are not. By way of example, machine learning system 118, or other items can be disposed outside of cloud 502, and accessed through cloud 502. Regardless of where they are located, they can be accessed directly by system 104 and/or system 108 through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
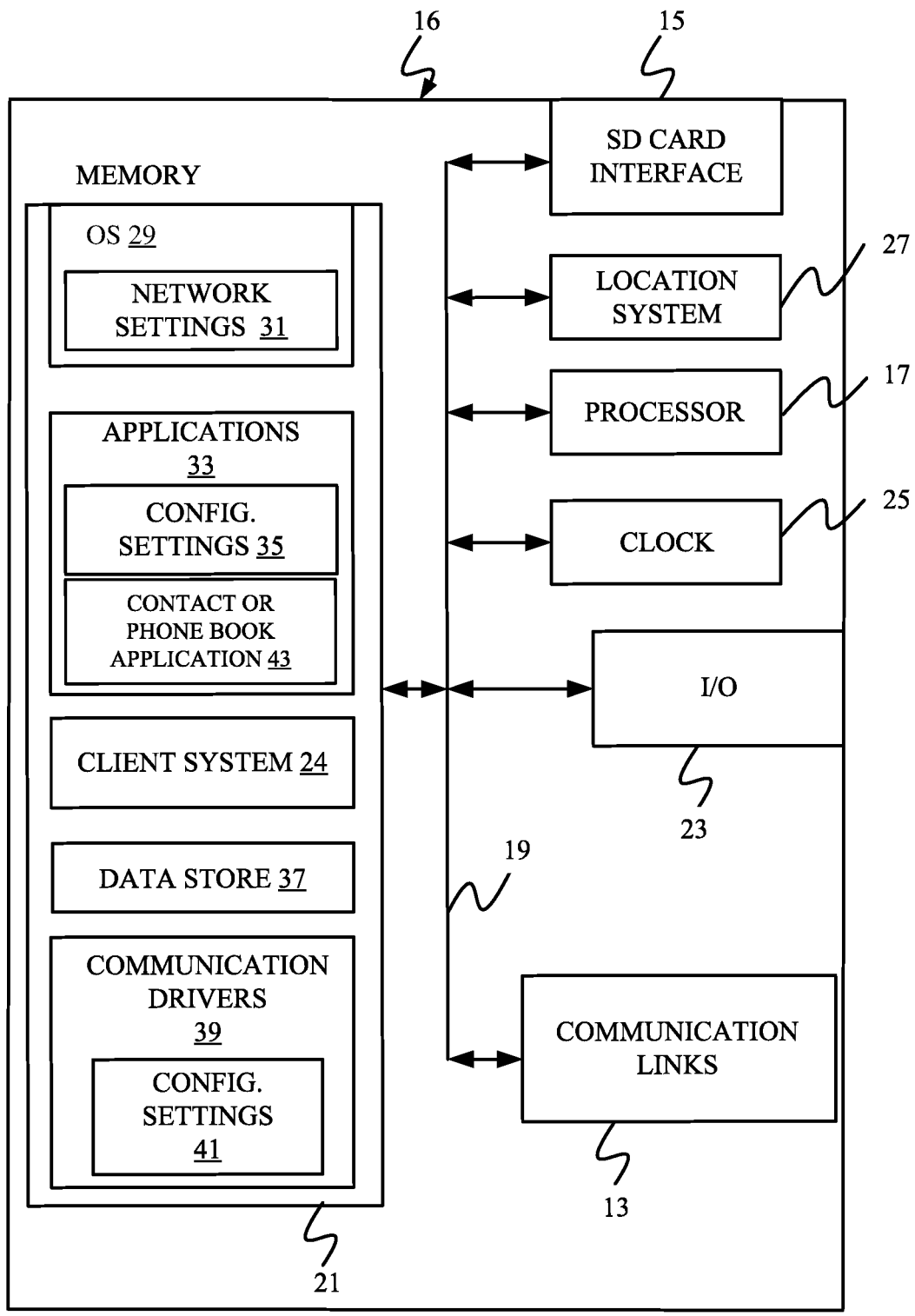
FIGS. 6-8 show examples of mobile devices that can deploy content creation client computing systems that can be used in the architectures shown in the previous figures
Figure 7:
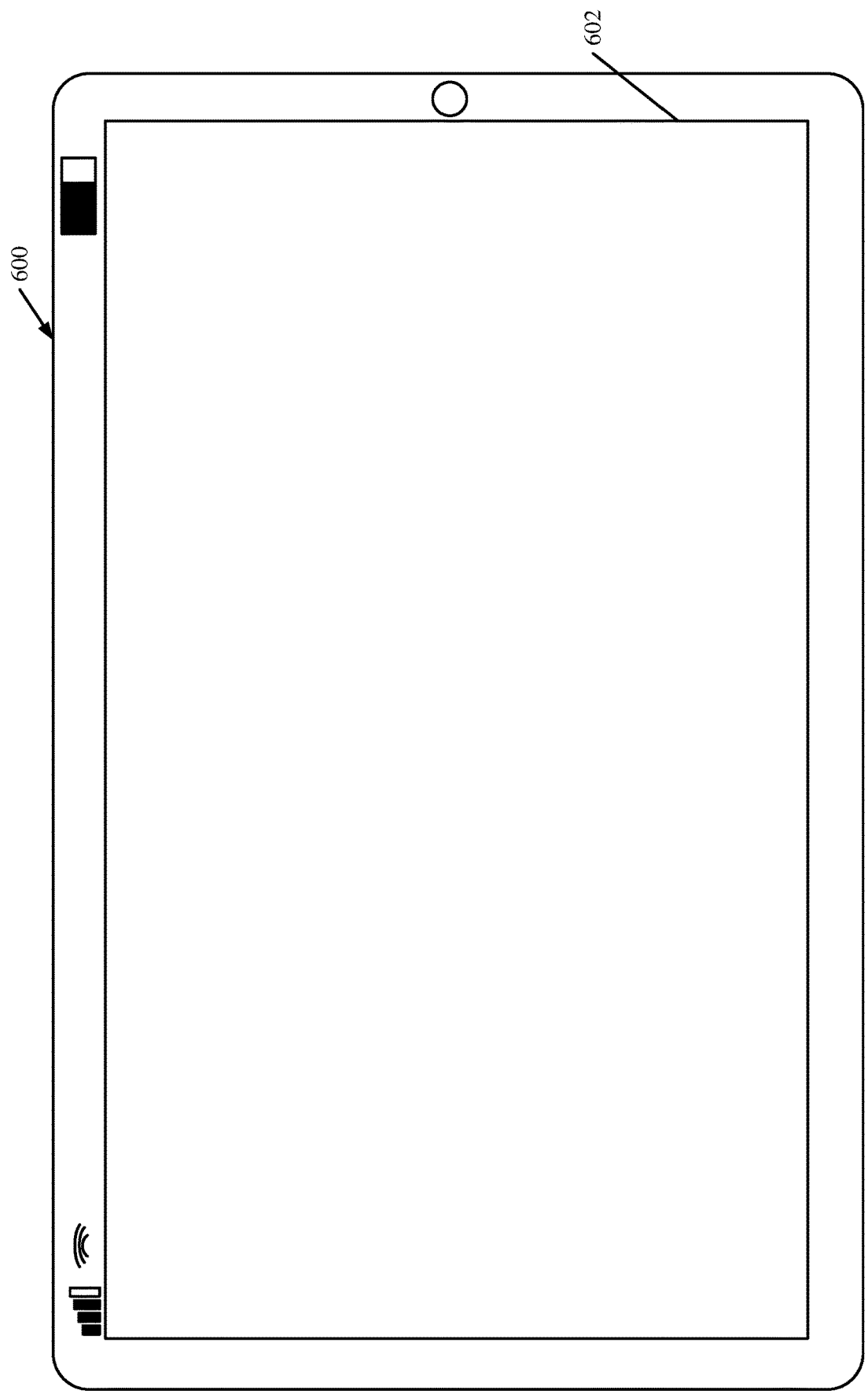
Figure 8:
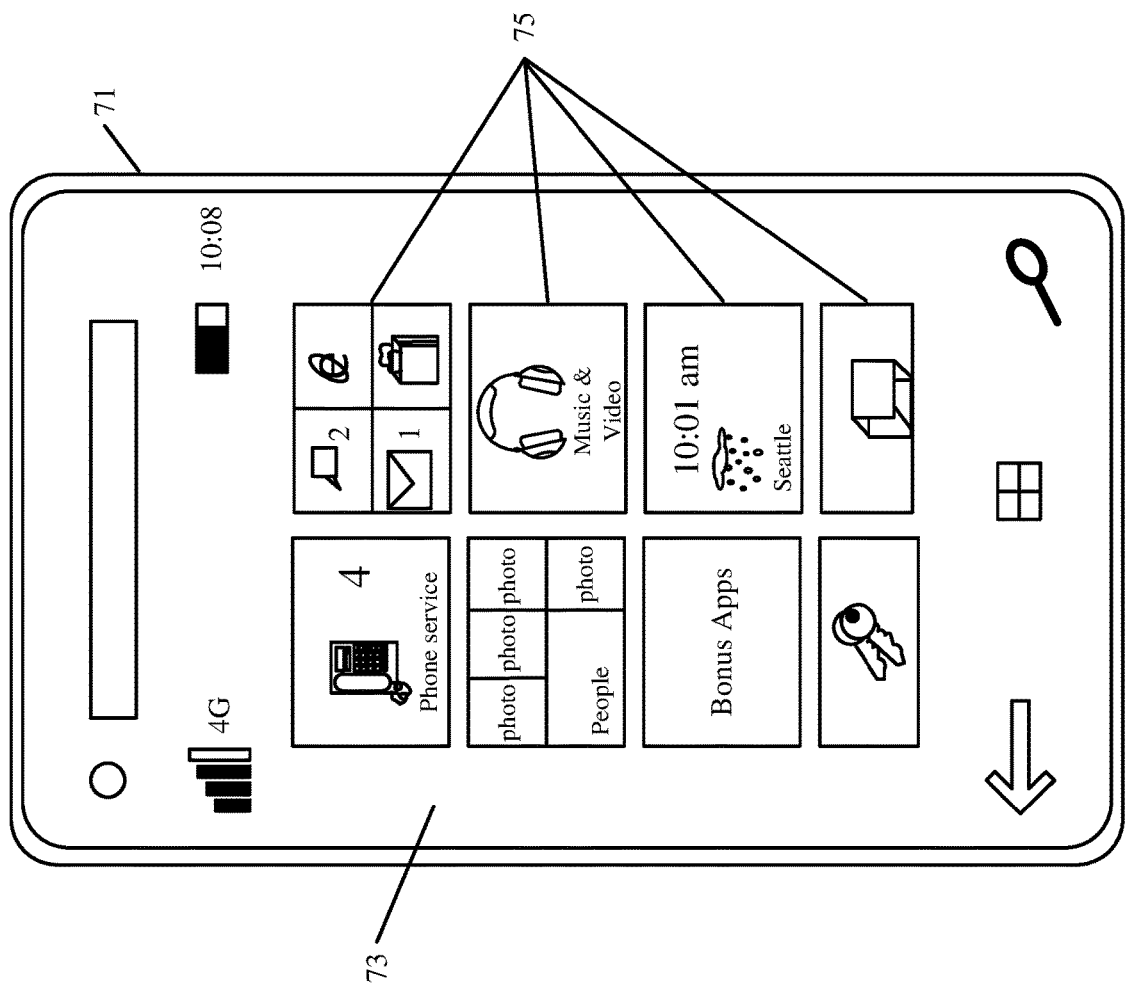

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or user device 504 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
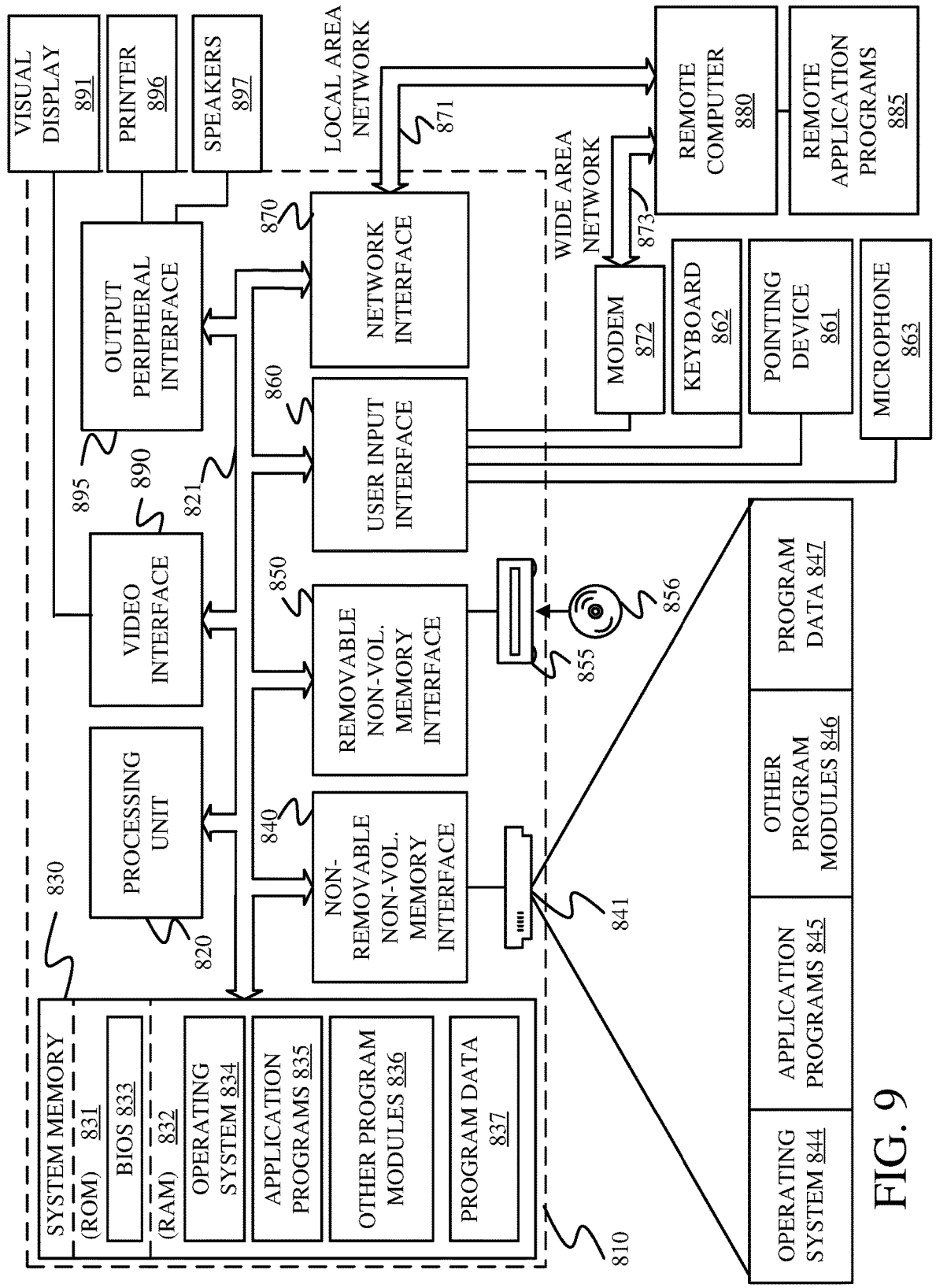
FIG. 9 is a block diagram of one example of a computing environment that can be used in the architectures illustrated in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
receiving, at an editor service computing system, a textual input from a content creation system;
providing the textual input from the editor service computing system to a rule-based grammar checker that applies rules to the textual input to identify a first potential error in the textual input and a first suggested modification to the textual input to address the first potential error;
receiving a grammar checker (GC) result, indicative of the first potential error and the first suggested modification, from the rule-based grammar checker;
providing the textual input from the editor service computing system to a machine learning (ML) model that receives the textual input as a model input and identifies a second potential error in the textual input and a second suggested modification to the textual input to address the second potential error;
receiving a ML model result, indicative of the second potential error and the second suggested modification, from the ML model;
generating an output representation, at the editor service computing system, based on at least one of the GC result and the ML model result; and
providing the output representation to the content creation system for user interaction.

Example 2 is the computer implemented method of any or all previous examples and further comprising:
applying, at the ML model and based on the model input, a machine learned core inference component that identifies the second potential error and the second suggested modification using a machine learned structure for making decisions.

Example 3 is the computer implemented method of any or all previous examples and further comprising:
receiving user interaction data indicative of detected user interaction with the output representation; and
performing machine learning on the machine learned structure, based on the user interaction data, to obtain a re-learned structure.

Example 4 is the computer implemented method of any or all previous examples and further comprising:
detecting that a model replacement criterion is met; and
replacing the ML model with a replacement ML model that has the re-learned structure.

Example 5 is the computer implemented method of any or all previous examples wherein preforming machine learning on the machine learned structure comprises:
aggregating user interaction data;
detecting that a training threshold is met based on the aggregated user interaction data; and
performing the machine learning on the machine learned structure based on the aggregated user interaction data Example 6 is the computer implemented method of any or all previous examples wherein generating the output representation comprises:
identifying, at the editor service computing system, an error type corresponding to the first potential error and an error type corresponding to the second potential error based on the GC result and the ML model result; and
generating the output representation based on the error type corresponding to the first potential error and the error type corresponding to the second potential error.

Example 7 is the computer implemented method of any or all previous examples wherein generating the output representation comprises:
aggregating, at the editor service computing system, the first and second suggested modifications; and
identifying whether the first suggested modification overlaps with the second suggested modification in the textual input.

Example 8 is the computer implemented method of any or all previous examples wherein generating the output representation further comprises:
if the first suggested modification overlaps with the second suggested modification in the textual input, then resolving, at the editor service computing system, which of the first and second suggested modifications to represent in the output representation.

Example 9 is the computer implemented method of any or all previous examples wherein resolving which of the first and second suggested modifications to represent in the output representation comprises:
resolving which of the first and second suggested modifications to represent in the output representation according to a predefined precedence hierarchy that ranks the rule-based grammar checker relative to the ML model.

Example 10 is the computer implemented method of any or all previous examples and further comprising:
prior to providing the textual input from the editor service computing system the ML model, applying a pre-filter to the textual input to identify a portion of the textual input to provide to the ML model and wherein providing the textual input to the ML model comprises providing only the identified portion of the textual input to the ML model.

Example 11 is the computer implemented method of any or all previous examples and further comprising:
applying a machine learned reassurance model, to the textual input and the output representation, to obtain a confidence value indicative of a likely utility of the suggested modification represented by the output representation, given the textual input.

Example 12 is an editor service computing system, comprising:
a processor;
an orchestration engine, implemented by the processor, that receives a textual input from a content creation system, provides the textual input to a rule-based grammar checker and receives a grammar checker (GC) result, indicative of a first potential error in the textual input and a first suggested modification to address the first potential error, the orchestration engine further providing the textual input to a machine learning (ML) model and receiving a ML model result, indicative of a second potential error in the textual input and a second suggested modification to address the second potential error; and
an output representation generator that generates an output representation based on at least one of the GC result and the ML model result and provides the output representation to the content creation system for user interaction.

Example 13 is the editor service computing system of any or all previous examples and further comprising:
an error type identifier component identifying an error type corresponding to the first potential error and an error type corresponding to the second potential error based on the GC result and the ML model result, wherein the output representation generator is configured to generate the output representation based on the error type corresponding to the first potential error and the error type corresponding to the second potential error.

Example 14 is the editor service computing system of any or all previous examples and further comprising:

a suggestion aggregation component that aggregates the first and second suggested modifications and indicates a portion of the textual input affected by the first suggested modification and a portion of the textual input affected by the second suggested modification.

Example 15 is the editor service computing system of any or all previous examples and further comprising:

an overlapping suggestion resolver component that identifies whether the portion of the textual input affected by the first suggested modification overlaps with the portion of the textual input affected by the second suggested modification and, if so, to resolve which of the first and second suggested modifications to provide to the output representation generator for the output representation.

Example 16 is the editor service computing system of any or all previous examples wherein the orchestration engine is further configured to, prior to providing the textual input to the ML model, applying a pre-filter to the textual input to identify a portion of the textual input to provide to the ML model and providing only the identified portion of the textual input to the ML model.

Example 17 is a computer implemented method, comprising:

receiving, at an editor service computing system, a textual input from a content creation system;

providing the textual input from an orchestration engine on the editor service computing system to a plurality of different proofing mechanisms;

receiving a result back from each of the plurality of different proofing mechanisms, each of the results identifying a potential error in the textual input and a corresponding suggested modification to the textual input;

generating an output representation, at the editor service computing system, based on at least one of the plurality of results; and providing the output representation to the content creation system for user interaction.

Example 18 is the computer implemented method of any or all previous examples wherein generating the output representation comprises:

aggregating, at the editor service computing system, the results from each of the plurality of different proofing mechanisms;

identifying portions in the textual input affected by the suggested modifications in the results;

determining whether the portions in the textual input affected by the results overlap with one another; and if so, then resolving, at the editor service computing system, which of the suggested modifications to represent in the output representation.

Example 19 is the computer implemented method of any or all previous examples wherein one of the plurality of different proofing mechanisms comprises a rule-based grammar checker, and further comprising:

applying rules, at the rule-based grammar checker, to the textual input to identify a first potential error in the textual input and a first suggested modification to the textual input to address the first potential error;

generating a grammar checker (GC) result, indicative of the first potential error and the first suggested modification, from the rule-based grammar checker; and providing the GC result to the editor service computing system.

Example 20 is the computer implemented method of any or all previous examples wherein one of the plurality of different proofing mechanisms comprises a machine learning (ML) model and further comprising:

providing the textual input from the editor service computing system to the machine learning (ML) model;

running a machine learned core inference component that identifies the second potential error and the second suggested modification, to obtain a ML model result, using a machine learned structure for making decisions; and providing the ML model result to the editor service computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   receiving, at an editor service computing system, a textual input from a content creation system;
   providing the textual input from the editor service computing system to a rule-based grammar checker that applies, to the textual input, a set of rules that represent a set of potential errors,
      wherein each rule of the set of rules includes a rule trigger that is linked to a suggested modification that addresses a potential error represented by the rule and is identified based on the rule trigger;
   receiving a grammar checker (GC) result from the rule-based grammar checker, wherein the GC result is based the set of rules and is indicative of a first potential error in the textual input and a first suggested modification to the textual input to address the first potential error;
   providing the textual input from the editor service computing system to a machine learning (ML) model that receives the textual input as a model input and identifies a second potential error in the textual input and a second suggested modification to the textual input to address the second potential error;
   receiving a ML model result, indicative of the second potential error and the second suggested modification, from the ML model;
   generating an output representation, at the editor service computing system, based on at least one of the GC result and the ML model result; and
   providing the output representation to the content creation system for user interaction.

2. The computer implemented method of claim 1 and further comprising:
   applying, at the ML model and based on the model input, a machine learned core inference component that identifies the second potential error and the second suggested modification using a machine learned structure for making decisions.

3. The computer implemented method of claim 2 and further comprising:
   receiving user interaction data indicative of detected user interaction with the output representation; and
   performing machine learning on the machine learned structure, based on the user interaction data, to obtain a re-learned structure.

4. The computer implemented method of claim 3 and further comprising:
   detecting that a model replacement criterion is met; and
   replacing the ML model with a replacement ML model that has the re-learned structure.

5. The computer implemented method of claim 3 wherein preforming machine learning on the machine learned structure comprises:
   aggregating user interaction data;
   detecting that a training threshold is met based on the aggregated user interaction data; and performing the machine learning on the machine learned structure based on the aggregated user interaction data.

6. The computer implemented method of claim 1 wherein generating the output representation comprises:
   identifying, at the editor service computing system, an error type corresponding to the first potential error and an error type corresponding to the second potential error based on the GC result and the ML model result; and
   generating the output representation based on the error type corresponding to the first potential error and the error type corresponding to the second potential error.

7. The computer implemented method of claim 1 wherein generating the output representation comprises:
   aggregating, at the editor service computing system, the first and second suggested modifications; and
   identifying whether the first suggested modification overlaps with the second suggested modification in the textual input.

8. The computer implemented method of claim 7 wherein generating the output representation further comprises:
   if the first suggested modification overlaps with the second suggested modification in the textual input, then resolving, at the editor service computing system, which of the first and second suggested modifications to represent in the output representation.

9. The computer implemented method of claim 8 wherein resolving which of the first and second suggested modifications to represent in the output representation comprises:
   resolving which of the first and second suggested modifications to represent in the output representation according to a predefined precedence hierarchy that ranks the rule-based grammar checker relative to the ML model.

10. The computer implemented method of claim 1 and further comprising:
    prior to providing the textual input from the editor service computing system to the ML model, applying a pre-filter to the textual input to identify a portion of the textual input to provide to the ML model and wherein providing the textual input to the ML model comprises providing only the identified portion of the textual input to the ML model.

11. The computer implemented method of claim 1 and further comprising:
    applying a machine learned reassurance model, to the textual input and the output representation, to obtain a confidence value indicative of a likely utility of the suggested modification represented by the output representation, given the textual input.

12. An editor service computing system, comprising:
    a processor;
    an orchestration engine, implemented by the processor, configured to:
       receive a textual input from a content creation system;
       provide the textual input to a rule-based grammar checker that applies, to the textual input, a set of rules that represent a set of potential errors wherein each rule of the set of rules includes a rule trigger that is linked to a suggested modification that addresses a potential error represented by the rule and is identified based on the rule trigger;
       receive a grammar checker (GC) result from the rule-based grammar checker, wherein the GC result is based on the set of rules and is indicative of a first potential error in the textual input and a first suggested modification to address the first potential error;
       provide the textual input to a machine learning (ML) model;
       receive a ML model result, indicative of a second potential error in the textual input and a second suggested modification to address the second potential error; and
    an output representation generator configured to;
       generate an output representation based on at least one of the GC result and the ML model result; and
       provide the output representation to the content creation system for user interaction.

13. The editor service computing system of claim 12 and further comprising:
    an error type identifier component configured to identify an error type corresponding to the first potential error and an error type corresponding to the second potential error based on the GC result and the ML model result, wherein the output representation generator is configured to generate the output representation based on the error type corresponding to the first potential error and the error type corresponding to the second potential error.

14. The editor service computing system of claim 12 and further comprising:
    a suggestion aggregation component configured to aggregate the first and second suggested modifications and indicate a portion of the textual input affected by the first suggested modification and a portion of the textual input affected by the second suggested modification.

15. The editor service computing system of claim 14 and further comprising:
    an overlapping suggestion resolver component configured to identify whether the portion of the textual input affected by the first suggested modification overlaps with the portion of the textual input affected by the second suggested modification and, if so, to resolve which of the first and second suggested modifications to provide to the output representation generator for the output representation.

16. The editor service computing system of claim 12 wherein the orchestration engine is further configured to, prior to providing the textual input to the ML model, apply a pre-filter to the textual input to identify a portion of the textual input to provide to the ML model and provide only the identified portion of the textual input to the ML model.

* * * * *